United States Patent [19]
Ackley et al.

[11] Patent Number: 5,369,656
[45] Date of Patent: Nov. 29, 1994

[54] INVERTED DRIVE DESIGN FOR VCSEL-BASED OPTICAL INTERCONNECTS

[75] Inventors: Donald E. Ackley, Lambertville, N.J.; Chan-Long Shieh, Paradise Valley; Earnest J. Johnson, Mesa, both of Ariz.

[73] Assignee: Motorola, Inc., Schaumburg, Ill.

[21] Appl. No.: 168,330

[22] Filed: Dec. 17, 1993

[51] Int. Cl.$^5$ ............................................... H01S 3/00
[52] U.S. Cl. ......................................... 372/38; 359/173
[58] Field of Search ......................... 372/38; 385/1, 2; 359/173, 188, 195

[56] References Cited

U.S. PATENT DOCUMENTS 4,399,563 8/1983 Greenburg ........................... 359/173
5,278,686 1/1994 Grasso et al. ........................ 359/173

Primary Examiner—Rodney B. Bovernick
Assistant Examiner—Robert E. Wise
Attorney, Agent, or Firm—Eugene A. Parsons

[57] ABSTRACT

An inverted drive optical interconnect link including an optical transmitter module designed to change input bits of logical value one to output bits of logical value zero and vice-versa, an optical receiver module designed to change input bits of logical value zero to output bits of logical value one and vice-versa, and an optical waveguide connected to the transmitter module and to the receiver module so that electrical signals input to the transmitter module are faithfully reproduced at an electrical output of the receiver module.

16 Claims, 3 Drawing Sheets

5,369,656

INVERTED DRIVE DESIGN FOR VCSEL-BASED OPTICAL INTERCONNECTS

FIELD OF THE INVENTION

The present invention pertains to vertical cavity surface emitting lasers (VCSEL) and more specifically to an improved drive scheme for VCSELs.

BACKGROUND OF THE INVENTION

Vertical cavity surface emitting lasers (VCSELs) commonly used in optical interconnects suffer from thermal lensing effects that lead to long turn-on delays and degradation of the error rates in interconnect systems.

In general, optical interconnects are used to link together computers and peripherals in networks requiring high speed data transport, low power consumption and immunity to electromagnetic interference. To achieve high bit rates, it has been necessary to use edge emitting laser diodes which present problems with packaging, power consumption, temperature sensitivity, and cost. Recently developed vertical cavity surface emitting lasers (VCSELs) provide a high performance alternative to edge emitters, simplifying the packaging problem, reducing power consumption and substantially reducing the cost of an optoelectronic transmitter module, and hence the cost of an entire optical interconnect link. The VCSELs employed to demonstrate optical interconnect performance have generally been of the proton-bombarded type, which exhibit strong thermal lensing effects that lead to large turn-on delays and large error rates in the presence of burst-mode data. While techniques that involve pre-biasing the lasers can alleviate the problem, these techniques necessarily add significant cost and complexity to the drive circuitry within the optical transmitter module. Constant duty-cycle coding schemes such as Manchester coding can also alleviate the turn-on delay problem, again at the cost of increased complexity and reduced flexibility.

In general, a digital optical interconnect converts an electrical bit stream at the transmitter to an optical bit stream, which propagates down an optical fiber or other optical waveguide until it reaches an optoelectronic receiver module where it is again converted to an electrical bit stream that faithfully replicates the bit stream at the transmitter end. Usually, the optical bit stream replicates the input electrical bit stream. However, in many data streams with arbitrary coding and burst transmission, there are long periods where no signal is sent at all. These long periods of inactivity allow the VCSELs in the transmitter module to cool off, which then results in a turn-on delay as long as a few microseconds when data transmission begins again. A delay of that length can lead to the loss of many bits at the beginning of the data stream. Thus there is a pressing need for a simple means to reduce the turn-on delay problems in VCSEL-based optical links.

Many complicated techniques to shape the input drive pulses to the source lasers for have been attempted. A scheme for pulse-shaping to minimize turn-on delay described in R. A. Nordin et al, Proc. 1993 ECTC, IEEE, pp. 795–801 (1993) is incorporated herein by reference.

SUMMARY OF THE INVENTION

It is a purpose of this invention to provide a new and improved design for an optical interconnect link based on VCSELs and other optoelectronic sources exhibiting thermal turn-on delay problems.

It is a further purpose of this invention to provide a simple drive scheme to significantly improve performance of VCSELs in optical interconnects.

An optical interconnect with a logical bit inverter is utilized in the transmitter module to turn logical zeroes into logical ones, and vice-versa. Thus, during long periods when no data is being transmitted, the VCSELs in the transmitter are still turned on and operating at their normal temperature. When the data stream resumes again, logical ones are converted to logical zeroes and the lasers are shut off for those bits. However, there are no delays associated with the turn-off process and therefore no bits are lost, thus minimizing the bit error rate (BER). At the optical receiver module, the incoming optical signal is logically inverted relative to the data stream originally input to the transmitter. A second logical bit inverter is added to the receiver end to recover the correct logical sense of the bit stream and the output data stream faithfully replicates the input data stream, albeit with much fewer errors.

The technique described herein is substantially simpler than the prior art and achieves the same reduction in turn-on delay.

BRIEF DESCRIPTION OF THE DRAWINGS

Referring to the Drawings.

DESCRIPTION OF THE PREFERRED EMBODIMENTS

Figure 1:
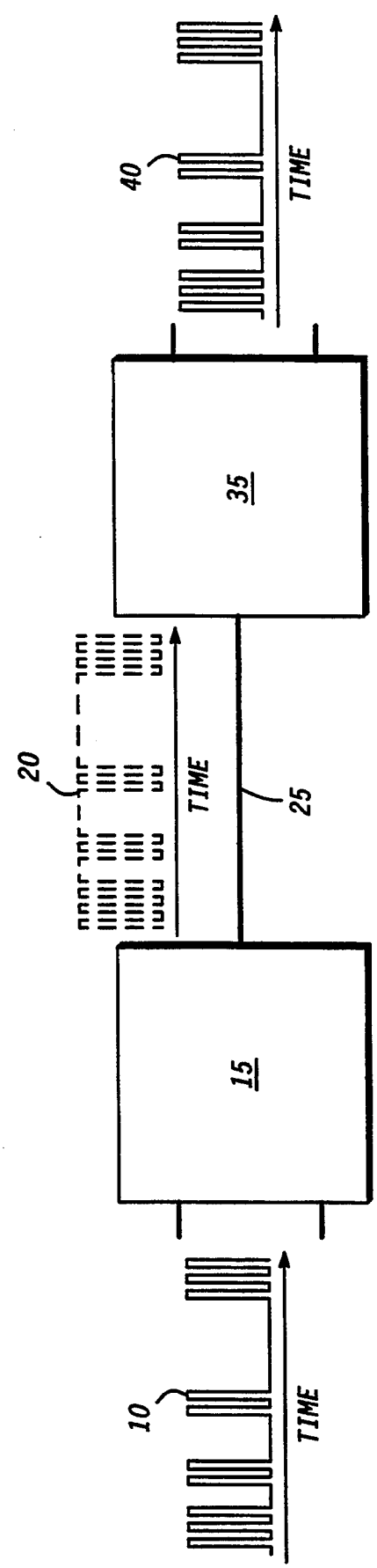
FIG. 1 is a block diagram of an optical interconnect link incorporating the present invention, showing a portion of the electrical and optical bit streams propagating at various points in the optical interconnect link.

Referring specifically to FIG. 1, a block diagram for an optical interconnect link incorporating the present invention and the propagating data bit streams is illustrated. An electrical data bit stream 10, which has a larger fraction of logical zeroes than logical ones, is input to optical transmitter module 15. Optical transmitter module 15 transforms bit stream 10 into an optical data bit stream 20, which is a logically inverted replica of bit stream 10 with logical ones transformed into logical zeroes and logical zeroes transformed into logical ones. Optical bit stream 20 is coupled into an optical waveguide 25 where it propagates down to an optical receiver module 35. Receiver module 35 converts optical bit stream 20 into an output electrical data bit stream 40 which is a logically inverted replica of optical bit stream 20, once again with logical zeroes transformed into logical ones and logical ones transformed into logical zeroes. Bit stream 40 is the optical interconnect link output and is a faithful replica of input data bit stream 10.

Figure 2:
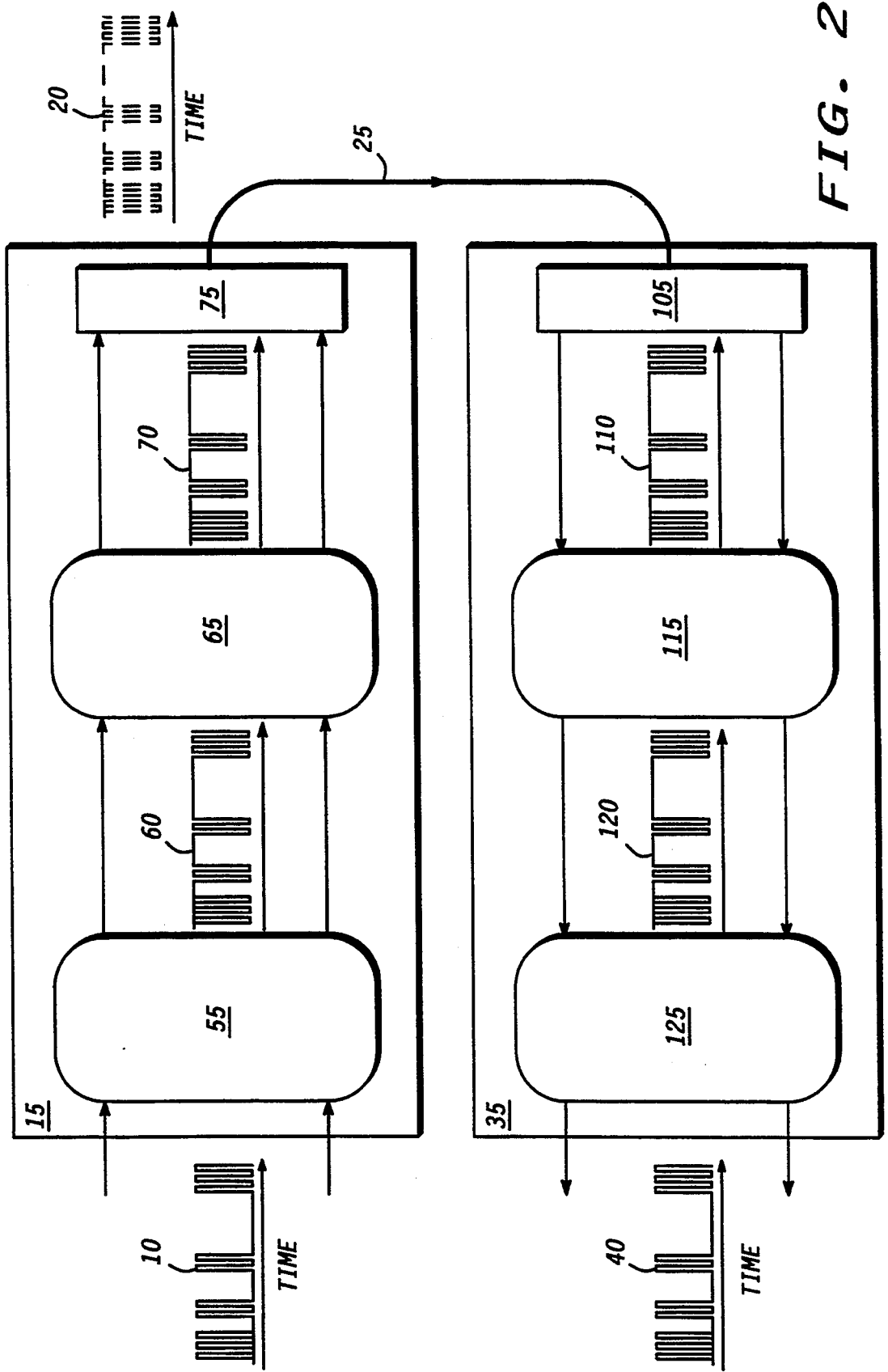
FIG. 2 is a detail block diagram of the optical interconnect link of FIG. 1 incorporating logical bit inverters.

Referring specifically to FIG. 2, a detail block diagram of the optical interconnect link of FIG. 1 is illustrated. More specifically, optical transmitter module 15 and optical receiver module 35 are illustrated in more detail. Electrical data bit stream 10 from a host computer or peripheral (not shown) is impressed onto the input terminals of a logical bit inverter 55 in optical transmitter module 15. Inverter 55 can be any of the electronic inverters known to those skilled in the art, such as semiconductor amplifiers, CMOS circuits, etc. Inverter 55 transforms logical ones into logical zeroes and logical zeroes into logical ones, resulting in inverted electrical bit stream 60. Bit stream 60 then serves as the input to a laser driver integrated circuit 65 which conditions bit stream 60 into electrical bit stream 70 with signal levels suitable for driving a VCSEL 75. The output from VCSEL 75 is optical bit data stream 20 which is an inverted version of the input electrical bit data stream 10.

Optical bit stream 20 is coupled into optical waveguide 25 which in this embodiment is an optical fiber. It will of course be understood that optical waveguide 25 can include glass fibers, plastic fibers, molded waveguides, such as polymers, etc. Optical bit stream 20 propagates down waveguide 25 until it reaches optical receiver module 35, where it is detected by a detector-amplifier pair 105. Detector-amplifier pair 105 converts optical bit stream 20 into an electrical signal 110 which replicates the optical signal variations of optical bit stream 20. Electrical signal 110 is input into a decision circuit 115 which reproduces the logical content of optical bit stream 20 and conditions the electrical levels of signal 110 to the correct voltage and current levels for logic circuitry. Decision circuit 115 is known in the art and can include, for example, zero crossing circuits or the like as well as amplifiers for shaping, etc.

The output of decision circuit 115 is an electrical bit stream 120 which is then input into a logical bit inverter 125. Inverter 125 can again include circuitry similar to inverter 55, described above. Inverter 125 transforms the logical ones and zeroes of bit stream 120 into logical zeroes and ones. The output of inverter 125 is electrical bit stream 40 which faithfully replicates input electrical bit stream 10 to transmitter module 15. Bit stream 40 is then output to a user computer or peripheral.

While the description incorporated herein describes a single optical interconnect with information traveling in a single direction, the embodiment can be readily extended to fully bi-directional optical interconnect links and multi-channel optical links by incorporating additional optical transmitter modules 15 and receiver modules 35 and additional optical fibers 25.

Figure 3:
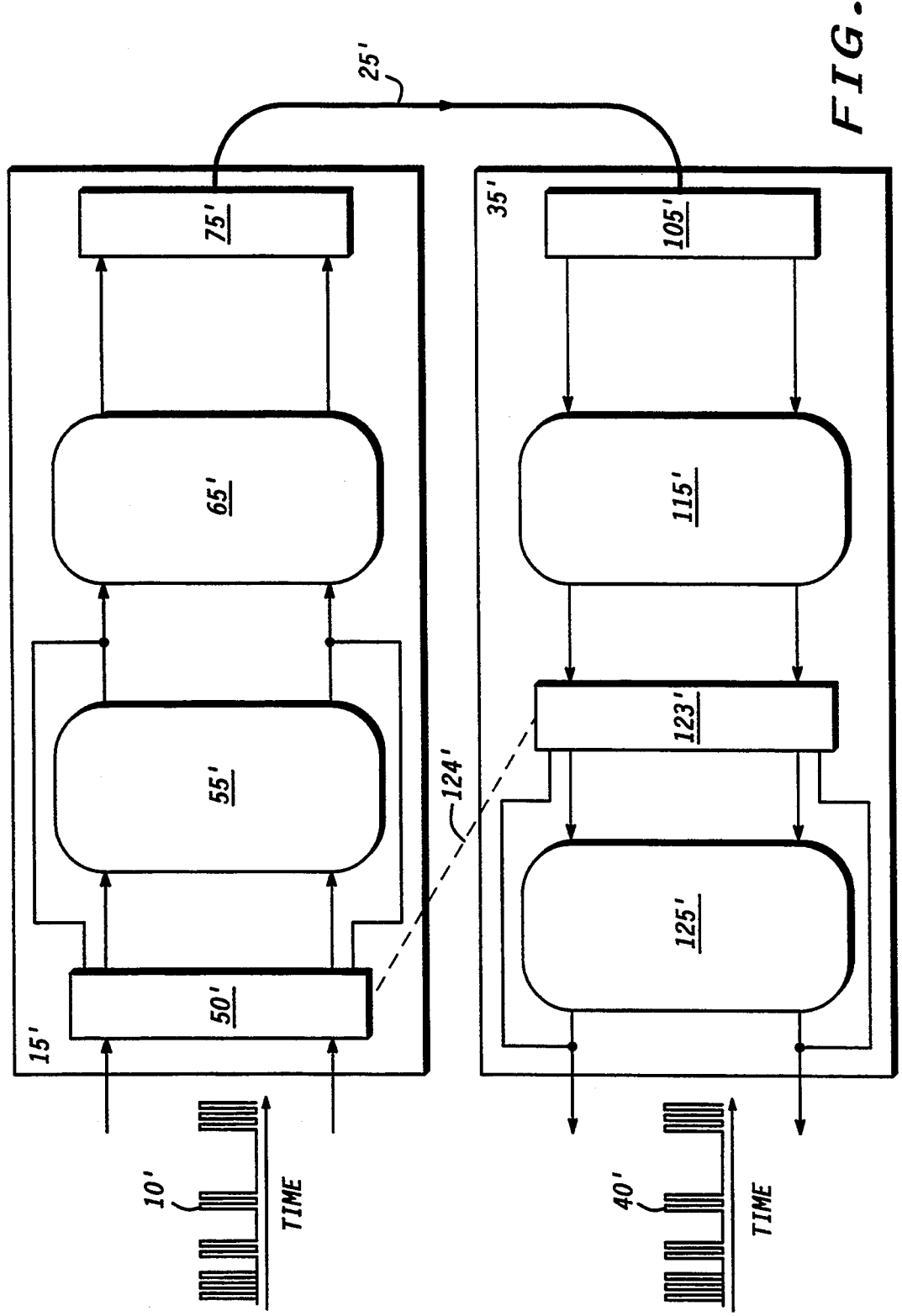
FIG. 3 is a detail block diagram similar to FIG. 2 of another embodiment of an optical interconnect link.

Referring specifically to FIG. 3, a detail block diagram of another embodiment of an optical interconnect link is illustrated, wherein similar components are designated with similar numbers and a prime is added to indicate the different embodiment. In some applications, or in specific instances during normal applications, data coding schemes incorporating a large fraction of logical ones may be utilized. In such instances the bit inverter may be bypassed in a scheme generally as illustrated in FIG. 3.

Electrical data bit stream 10' from a host computer or peripheral (not shown) is impressed onto the input terminals of an electronic sensing and switching circuit 50'. One output of circuit 50' is connected to the input of a logical bit inverter 55' in optical transmitter module 15' and another output bypasses inverter 55' and is connected directly to the input of a laser driver integrated circuit 65'. Electronic sensing and switching circuit 50' includes, for example, a bit sensing circuit which could include an amplitude or threshold detector, zero crossing detector etc., a timing circuit and a delay in supplying the bit stream to the output. Thus, the circuit senses bits of data in the bit stream and, when the time between serial ones in the bit stream exceeds a predetermined time, circuit 50' switches the output data stream to inverter 55'. When the bit stream is relatively constant and does not include a large fraction of logical zeros circuit 50' switches the output data stream to laser driver integrated circuit 65', which then operates as described above.

An electronic sensing and switching circuit 123' is connected to receive the output signals from a decision circuit 115' and includes an output connected to a logical bit inverter 125' and a second output connected directly to the output of optical receiver module 35'. Circuit 123' can include only a switching circuit which is operated by a connection. optical or electrical, indicated by broken line 124'. Circuit 123' can also be substantially similar to circuit 50' and can be constructed to switch each time circuit 50' switches so that inverted bits are always returned to normal in the output and bits which are not inverted simply remain in the normal orientation.

Thus, by providing logical bit inverters within the optical transmitter and receiver modules, an optical link is constructed in which the optical bit stream propagating on the optical fiber is logically inverted from the input and output electrical signals. This inversion of the optical signal allows the VCSELs in the transmitter module to be turned ON a large fraction of the time, substantially reducing lasing turn-on delay and resulting in significantly reduced errors and improved performance of the optical link.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

We claim:

1. An inverted drive optical interconnect link comprising:

an optical transmitter module constructed to transform an input digital electrical signal into an output digital optical signal and being designed to change an input bit of logical value one to an output bit of logical value zero and an input bit of logical value zero to an output bit of logical value one;

an optical receiver module designed to transform an input digital optical signal into an output digital electrical signal and being further designed to change an input bit of logical value zero to an output bit of logical value one and an input bit of logical value one to an output bit of logical value zero; and an optical waveguide connected to the optical transmitter module and to the optical receiver module so that the output optical signal of the transmitter module propagates down the waveguide to become the input optical signal to the receiver module and an electrical digital data stream input to the transmitter module is faithfully reproduced at the electrical output of the receiver module.

2. An inverted drive optical interconnect link as claimed in claim 1 wherein the optical transmitter module includes a vertical cavity surface emitting laser with optical output coupled to the optical waveguide, a driver circuit electrically connected to the vertical cavity surface emitting laser so as to directly drive the vertical cavity surface emitting laser, a bit inverter circuit electrically connected to the driver circuit so as to change incoming bits from logical one to logical zero and from logical zero to logical one and output the changed bits to the circuit driver, and the bit inverter normally outputting a logical zero when transmitted information is absent.

3. An inverted drive optical interconnect link as claimed in claim 2 wherein errors introduced by the optical transmitter module into the optical output for the electrical data bit stream are substantially reduced by having the vertical cavity surface emitting laser ON a substantial fraction of the time.

4. An inverted drive optical interconnect link as claimed in claim 2 wherein the optical transmitter module further includes in addition, circuitry connected to receive the input digital electrical signals and to provide the received signal directly to the driver for bypassing the bit inverter for data coding schemes incorporating a large fraction of logical ones.

5. An inverted drive optical interconnect link as claimed in claim 1 wherein the optical receiver module includes a photodetector and amplifier constructed to convert an input optical signal from the optical fiber into an output electrical signal, a decision circuit electrically connected to the amplifier and converting the output electrical signal from the photodetector and amplifier into an electrical data bit stream, and a bit inverter circuit electrically connected to the decision circuit and changing signal bits from logical zero to logical one and from logical one to logical zero and outputting the changed signal bits as an electrical data bit stream.

6. An inverted drive optical interconnect link as claimed in claim 5 wherein the optical receiver module further includes in addition, circuitry connected to receive the electrical data bit stream from the decision circuit and to provide the received electrical data bit stream directly to an output of the optical receiver module for bypassing the bit inverter for data coding schemes incorporating a large fraction of logical ones.

7. An inverted drive optical interconnect link as claimed in claim 1 including a multi-channel optical interconnect link comprising several optical interconnect links operating simultaneously.

8. An inverted drive optical interconnect link as claimed in claim 7 further including a bi-directional optical link comprising multi-channel optical interconnect links operating simultaneously in both directions.

9. An inverted drive optical interconnect link as claimed in claim 1 further including a plurality of optical transmitter modules, optical receiver modules and optical waveguides connected so as to operate simultaneously in both directions to provide a bi-directional optical link.

10. An inverted drive optical interconnect link as claimed in claim 1 wherein the optical waveguide is an optical fiber.

11. An inverted drive optical interconnect link as claimed in claim 1 wherein the optical waveguide is a polymer optical waveguide.

12. An inverted drive optical interconnect link comprising:

an optical transmitter module constructed to transform an input digital electrical signal into an output digital optical signal and being designed to change an input bit of logical value one to an output bit of logical value zero and an input bit of logical value zero to an output bit of logical value one, the optical transmitter module including a vertical cavity surface emitting laser with optical output coupled to the optical waveguide, a driver circuit electrically connected to the vertical cavity surface emitting laser so as to directly drive the vertical cavity surface emitting laser, a first bit inverter circuit electrically connected to the driver circuit so as to change incoming bits from logical one to logical zero and from logical zero to logical one and output the changed bits to the circuit driver, and the first bit inverter circuit normally outputting a logical zero when transmitted information is absent;

an optical receiver module designed to transform an input digital optical signal into an output digital electrical signal and being further designed to change an input bit of logical value zero to an output bit of logical value one and an input bit of logical value one to an output bit of logical value zero, the optical receiver module including a photodetector and amplifier constructed to convert an input optical signal from the optical fiber into an output electrical signal, a decision circuit electrically connected to the amplifier and converting the output electrical signal from the photodetector and amplifier into an electrical data bit stream, and a second bit inverter circuit electrically connected to the decision circuit and changing signal bits from logical zero to logical one and from logical one to logical zero and outputting the changed signal bits as an electrical data bit stream; and an optical waveguide connected to the optical transmitter module and to the optical receiver module so that the output optical signal of the transmitter module propagates down the waveguide to become the input optical signal to the receiver module and an electrical digital data stream input to the transmitter module is faithfully reproduced at the electrical output of the receiver module.

13. An inverted drive optical interconnect link as claimed in claim 12 wherein the optical transmitter module further includes circuitry connected to receive the input digital electrical signals and to provide the received signal directly to the driver and wherein the optical receiver module further includes circuitry connected to receive the electrical data bit stream from the decision circuit and to provide the received electrical data bit stream directly to an output of the optical receiver module for bypassing the first and second bit inverters for data coding schemes incorporating a large fraction of logical ones.

14. A method of operating an optical interconnect link comprising the steps of:

providing an optical interconnect link including an optical transmitter having an input for receiving electrical signals, the optical transmitter being constructed to convert received electrical signals to optical signals, an optical waveguide having first and second ends and coupled to receive the optical signals from the optical transmitter in the first end thereof, and an optical receiver coupled to receive the optical signals from the second end of the optical waveguide and convert the optical signals to electrical signals at an output thereof;

receiving electrical information signals, inverting the logical content of the received electrical information signals, and supplying the inverted electrical signals to the input of the optical transmitter; and receiving the inverted electrical information signals at the output of the optical receiver and inverting the logical content of the received inverted electrical information signals to provide a substantially faithful replica of the received electrical information signals.

15. A method of operating an optical interconnect link as claimed in claim 14 wherein the number of errors introduced into the information signal by the interconnect link is substantially reduced.

16. A method of operating an optical interconnect link with multiple signals comprising the steps of:

providing an optical interconnect link including a plurality of optical transmitters each having an input for receiving electrical signals, with each optical transmitter being constructed to convert received electrical signals to optical signals;

providing a plurality of parallel optical waveguides each having first and second ends coupled to receive an optical signal from a single corresponding optical transmitter in the first end thereof, and a plurality of optical receivers each coupled to receive the optical signals from the second end of a corresponding optical waveguide and convert the optical signals to electrical signals at an output thereof;

receiving a plurality of electrical information signals, inverting the logical content of the received electrical information signals, and supplying the inverted electrical signals to the inputs of the optical transmitters; and receiving a plurality of inverted electrical information signals at the output of the corresponding optical receivers and inverting the logical content of the received inverted electrical information signals to provide a substantially faithful replica of the received electrical information signals.

* * * * *